United States Patent
Mukherjee et al.

(10) Patent No.: US 10,225,573 B1
(45) Date of Patent: Mar. 5, 2019

(54) VIDEO CODING USING PARAMETERIZED MOTION MODELS

(71) Applicant: GOOGLE INC., Mountain View, CA (US)

(72) Inventors: Debargha Mukherjee, Cupertino, CA (US); James Bankoski, Los Gatos, CA (US); Yue Chen, Sunnyvale, CA (US); Sarah Parker, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 16 days.

(21) Appl. No.: 15/420,564

(22) Filed: Jan. 31, 2017

(51) Int. Cl.
| | |
|---|---|
| *H04N 19/105* | (2014.01) |
| *H04N 19/172* | (2014.01) |
| *H04N 19/513* | (2014.01) |
| H04N 19/176 | (2014.01) |
| H04N 19/182 | (2014.01) |

(52) U.S. Cl.
CPC ......... *H04N 19/513* (2014.11); *H04N 19/105* (2014.11); *H04N 19/172* (2014.11); *H04N 19/176* (2014.11); *H04N 19/182* (2014.11)

(58) Field of Classification Search
CPC .................................................. H04N 19/513
See application file for complete search history.

(56) References Cited

U.S. PATENT DOCUMENTS

| | | | |
|---|---|---|---|
| 7,200,174 B2 | 4/2007 | Lainema et al. | |
| 8,363,721 B2 | 1/2013 | Tian et al. | |
| 8,411,757 B2 | 4/2013 | Karczewicz et al. | |
| 2008/0240247 A1 | 10/2008 | Lee et al. | |
| 2013/0121416 A1* | 5/2013 | He | H04N 19/597 375/240.14 |
| 2014/0355684 A1* | 12/2014 | Narroschke | H04N 19/139 375/240.16 |
| 2015/0110190 A1* | 4/2015 | Sartor | H04N 19/527 375/240.16 |

(Continued)

OTHER PUBLICATIONS

Wiegand, Thomas et al.; "Affine Multipicture Motion-Compensated Prediction"; IEEE Transfactions on Circuits and Systems for Video Technology, vol. 15, No. 2, Feb. 2005; pp. 197-209.

(Continued)

*Primary Examiner* — Tracy Y. Li
(74) *Attorney, Agent, or Firm* — Young Basile Hanlon & MacFarlane, P.C.

(57) ABSTRACT

A current block of a video frame can be encoded or decoded using parameterized motion models. First and second parameterized motion models are identified. The first parameterized motion model corresponds to a first motion model type, and the second parameterized motion model corresponds to a second motion model type. The first and second parameterized motion models are associated with one or more reference frames. One of the first or second parameterized motion models is selected along with an associated reference frame, such as based on a lowest prediction error. A motion vector is generated between the current block and the selected reference frame by warping pixels of the current block to a warped patch of the selected reference frame according to the selected parameterized motion model. A prediction block is generated using the motion vector, and the current block is encoded or decoded using the prediction block.

20 Claims, 8 Drawing Sheets

(56) References Cited

U.S. PATENT DOCUMENTS

2017/0013279 A1* 1/2017 Puri .................... H04N 19/176

OTHER PUBLICATIONS

Li, Shiwei et al; "Dual-Feature Warping-Based Motion Model Estimation"; ICCV Paper provided by the Computer Vision Foundation; 2015, pp. 4283-4291.

Bankoski, et al., "Technical Overview of VP8, an Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

* cited by examiner

VIDEO CODING USING PARAMETERIZED MOTION MODELS

BACKGROUND

Digital video streams may represent video using a sequence of frames or still images. Digital video can be used for various applications including, for example, video conferencing, high definition video entertainment, video advertisements, or sharing of user-generated videos. A digital video stream can contain a large amount of data and consume a significant amount of computing or communication resources of a computing device for processing, transmission, or storage of the video data. Various approaches have been proposed to reduce the amount of data in video streams, including compression and other encoding techniques.

SUMMARY

This disclosure relates generally to encoding and decoding video data and more particularly relates to global motion models for improved inter-prediction coding.

A method for encoding a current block of a video frame according to one implementation of the disclosure comprises identifying a first parameterized motion model corresponding to a first motion model type and a second parameterized motion model corresponding to a second motion model type. The first parameterized motion model and the second parameterized motion model are associated with one or more reference frames. One of the first parameterized motion model or the second parametrized motion model and one of the one or more reference frames is selected. A motion vector is generated between the current block and the selected reference frame based on the selected parameterized motion model. A prediction block is generated using the motion vector. The current block is then encoded using the prediction block.

A method for decoding an encoded block of an encoded video frame according to one implementation of the disclosure comprises identifying a first parameterized motion model corresponding to a first motion model type and a second parameterized motion model corresponding to a second motion model type. The first parameterized motion model and the second parameterized motion model are associated with one or more reference frames. One of the first parameterized motion model or the second parametrized motion model and one of the one or more reference frames is selected. A motion vector is generated between the encoded block and the selected reference frame based on the selected parameterized motion model. A prediction block is generated using the motion vector. The encoded block is then decoded using the prediction block.

An apparatus for decoding an encoded block of an encoded video frame according to another aspect of the disclosure comprises a processor configured to execute instructions stored in a non-transitory storage medium to identify a first parameterized motion model corresponding to a first motion model type and a second parameterized motion model corresponding to a second motion model type. The first parameterized motion model and the second parameterized motion model are associated with one or more reference frames. One of the first parameterized motion model or the second parametrized motion model and one of the one or more reference frames is selected. A motion vector is generated between the encoded block and the selected reference frame based on the selected parameterized motion model. A prediction block is generated using the motion vector. The encoded block is then decoded using the prediction block.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings described below, wherein like reference numerals refer to like parts throughout the several views.

DETAILED DESCRIPTION

Video compression schemes may include breaking respective images, or frames, into smaller portions, such as blocks, and generating an output bitstream using techniques to limit the information included for respective blocks in the output. An encoded bitstream can be decoded to re-create the source images from the limited information. Typical video compression and decompression schemes use regular motion compensation, which assumes purely translational motion between or within blocks, to predict the motion within blocks of frames to be encoded or decoded. However, not all motion within a block can be described using translational motion models, which are only capable of rectangular transformations. For example, some motion may include scaling, shearing, or rotating motion, either alone or with translational motion. Further, in cases where there is more than one global motion in a frame, a single motion model may not accurately predict all of the motion.

Implementations of this disclosure include using parameterized motion models to generate a prediction block for encoding or decoding individual blocks of a video frame having multiple translational or non-translational motion. Multiple parameterized motion models are identified for reference frames that are available for encoding or decoding a current block of the video frame. Each of the parameterized motion models associated with a reference frame corresponds to a different motion model type. For example, a reference frame can have a first parameterized motion model corresponding to a homographic motion model type, a second parameterized motion model corresponding to an affine motion model type, a third parameterized motion model corresponding to a similarity motion model type, and/or a fourth parameterized motion model corresponding to a translational motion model type. The different parameterized motion models can be used to predict different types of motion, such as scaling, shearing, or rotating motion. One of the parameterized motion model and the reference frame with which it is associated can be selected, such as based on a lowest prediction error. A prediction block is generated based on a motion vector, which is generated between the current block and the selected reference frame based on the selected parameterized motion model. The current block can then be encoded or decoded using the prediction block.

Figure 1:
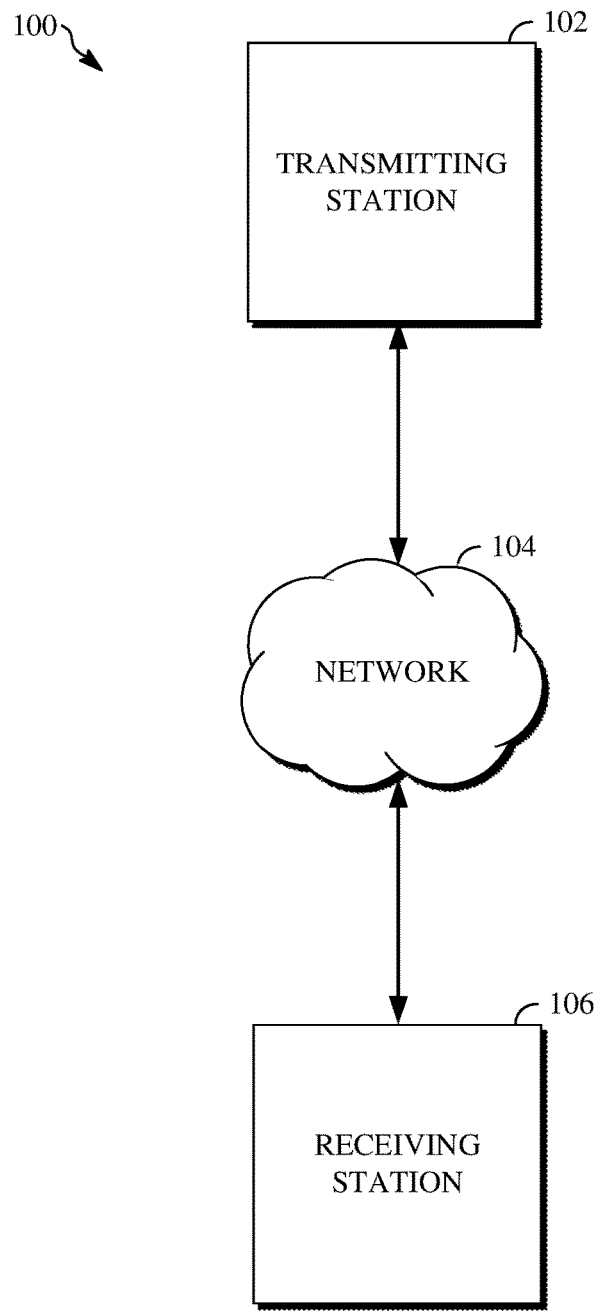
FIG. 1 is a schematic of a video encoding and decoding system.

Further details of techniques for using warped motion compensation to generate a prediction block are described herein with initial reference to a system in which they can be implemented. FIG. 1 is a schematic of a video encoding and decoding system 100. A transmitting station 102 can be, for example, a computer having an internal configuration of hardware such as that described in FIG. 2. However, other suitable implementations of the transmitting station 102 are possible. For example, the processing of the transmitting station 102 can be distributed among multiple devices.

A network 104 can connect the transmitting station 102 and a receiving station 106 for encoding and decoding of the video stream. Specifically, the video stream can be encoded in the transmitting station 102, and the encoded video stream can be decoded in the receiving station 106. The network 104 can be, for example, the Internet. The network 104 can also be a local area network (LAN), wide area network (WAN), virtual private network (VPN), cellular telephone network, or any other means of transferring the video stream from the transmitting station 102 to, in this example, the receiving station 106.

Figure 2:
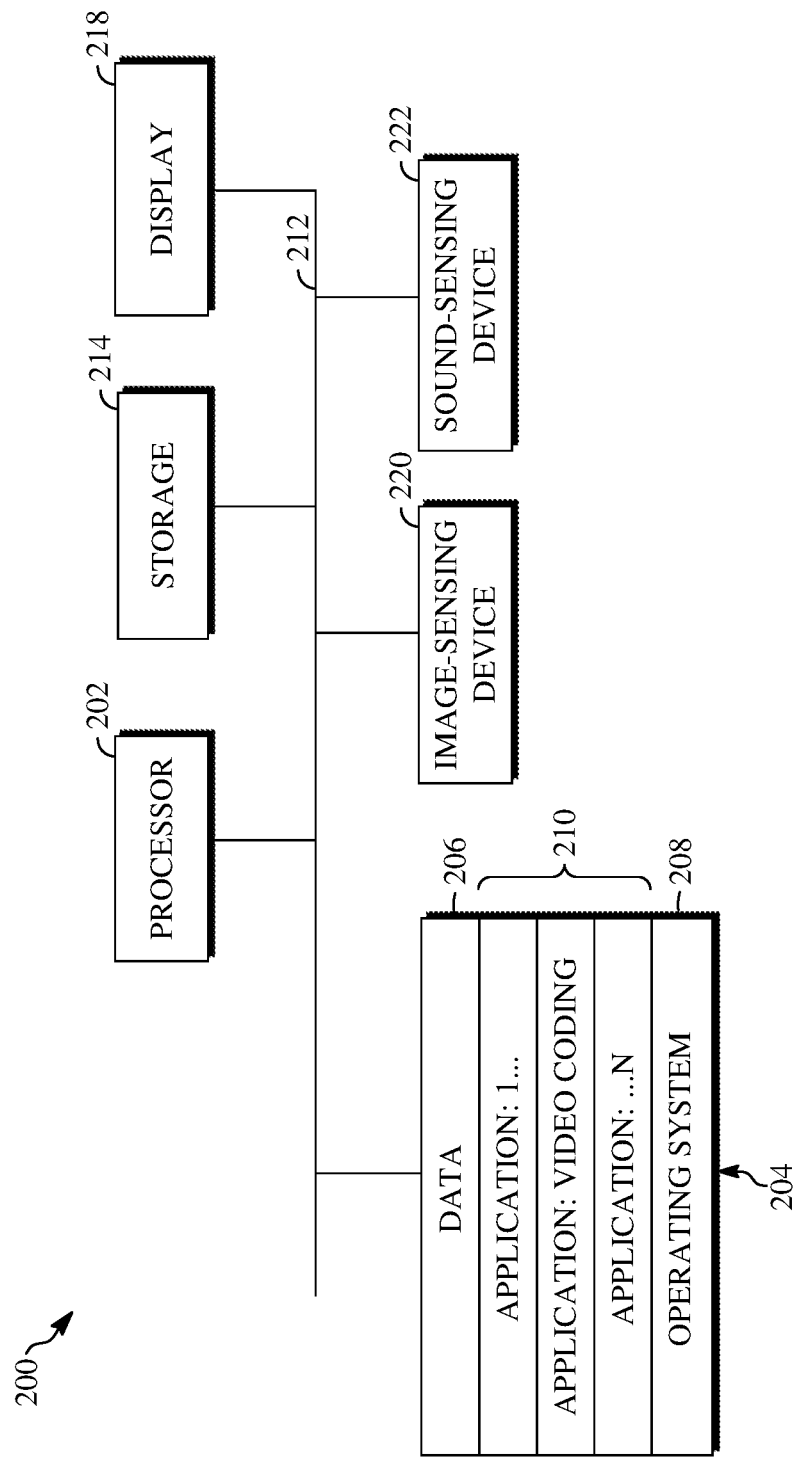
FIG. 2 is a block diagram of an example of a computing device that can implement a transmitting station or a receiving station.

The receiving station 106, in one example, can be a computer having an internal configuration of hardware such as that described in FIG. 2. However, other suitable implementations of the receiving station 106 are possible. For example, the processing of the receiving station 106 can be distributed among multiple devices.

Other implementations of the video encoding and decoding system 100 are possible. For example, an implementation can omit the network 104. In another implementation, a video stream can be encoded and then stored for transmission at a later time to the receiving station 106 or any other device having memory. In one implementation, the receiving station 106 receives (e.g., via the network 104, a computer bus, and/or some communication pathway) the encoded video stream and stores the video stream for later decoding. In an example implementation, a real-time transport protocol (RTP) is used for transmission of the encoded video over the network 104. In another implementation, a transport protocol other than RTP may be used (e.g., a Hypertext Transfer Protocol-based (HTTP-based) video streaming protocol).

When used in a video conferencing system, for example, the transmitting station 102 and/or the receiving station 106 may include the ability to both encode and decode a video stream as described below. For example, the receiving station 106 could be a video conference participant who receives an encoded video bitstream from a video conference server (e.g., the transmitting station 102) to decode and view and further encodes and transmits his or her own video bitstream to the video conference server for decoding and viewing by other participants.

FIG. 2 is a block diagram of an example of a computing device 200 that can implement a transmitting station or a receiving station. For example, the computing device 200 can implement one or both of the transmitting station 102 and the receiving station 106 of FIG. 1. The computing device 200 can be in the form of a computing system including multiple computing devices, or in the form of one computing device, for example, a mobile phone, a tablet computer, a laptop computer, a notebook computer, a desktop computer, and the like.

A CPU 202 in the computing device 200 can be a conventional central processing unit. Alternatively, the CPU 202 can be any other type of device, or multiple devices, capable of manipulating or processing information now existing or hereafter developed. Although the disclosed implementations can be practiced with one processor as shown (e.g., the CPU 202), advantages in speed and efficiency can be achieved by using more than one processor.

A memory 204 in computing device 200 can be a read only memory (ROM) device or a random access memory (RAM) device in an implementation. Any other suitable type of storage device can be used as the memory 204. The memory 204 can include code and data 206 that is accessed by the CPU 202 using a bus 212. The memory 204 can further include an operating system 208 and application programs 210, the application programs 210 including at least one program that permits the CPU 202 to perform the methods described herein. For example, the application programs 210 can include applications 1 through N, which further include a video coding application that performs the methods described here. Computing device 200 can also include a secondary storage 214, which can, for example, be a memory card used with a mobile computing device. Because the video communication sessions may contain a significant amount of information, they can be stored in whole or in part in the secondary storage 214 and loaded into the memory 204 as needed for processing.

The computing device 200 can also include one or more output devices, such as a display 218. The display 218 may be, in one example, a touch sensitive display that combines a display with a touch sensitive element that is operable to sense touch inputs. The display 218 can be coupled to the CPU 202 via the bus 212. Other output devices that permit a user to program or otherwise use the computing device 200 can be provided in addition to or as an alternative to the display 218. When the output device is or includes a display, the display can be implemented in various ways, including by a liquid crystal display (LCD), a cathode-ray tube (CRT) display, or a light emitting diode (LED) display, such as an organic LED (OLED) display.

The computing device 200 can also include or be in communication with an image-sensing device 220, for example, a camera, or any other image-sensing device 220 now existing or hereafter developed that can sense an image such as the image of a user operating the computing device 200. The image-sensing device 220 can be positioned such that it is directed toward the user operating the computing device 200. In an example, the position and optical axis of the image-sensing device 220 can be configured such that the field of vision includes an area that is directly adjacent to the display 218 and from which the display 218 is visible.

The computing device 200 can also include or be in communication with a sound-sensing device 222, for example, a microphone, or any other sound-sensing device now existing or hereafter developed that can sense sounds near the computing device 200. The sound-sensing device 222 can be positioned such that it is directed toward the user operating the computing device 200 and can be configured to receive sounds, for example, speech or other utterances, made by the user while the user operates the computing device 200.

Although FIG. 2 depicts the CPU 202 and the memory 204 of the computing device 200 as being integrated into one unit, other configurations can be utilized. The operations of the CPU 202 can be distributed across multiple machines (wherein individual machines can have one or more processors) that can be coupled directly or across a local area or other network. The memory 204 can be distributed across multiple machines such as a network-based memory or memory in multiple machines performing the operations of the computing device 200. Although depicted here as one bus, the bus 212 of the computing device 200 can be composed of multiple buses. Further, the secondary storage 214 can be directly coupled to the other components of the computing device 200 or can be accessed via a network and can comprise an integrated unit such as a memory card or multiple units such as multiple memory cards. The computing device 200 can thus be implemented in a wide variety of configurations.

Figure 3:
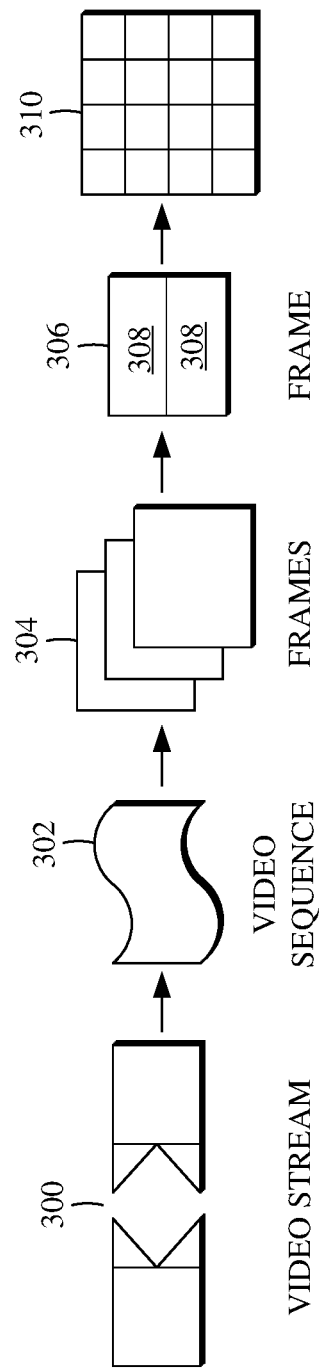
FIG. 3 is a diagram of a typical video stream to be encoded and subsequently decoded.

FIG. 3 is a diagram of an example of a video stream 300 to be encoded and subsequently decoded. The video stream 300 includes a video sequence 302. At the next level, the video sequence 302 includes a number of adjacent frames 304. While three frames are depicted as the adjacent frames 304, the video sequence 302 can include any number of adjacent frames 304. The adjacent frames 304 can then be further subdivided into individual frames, for example, a frame 306. At the next level, the frame 306 can be divided into a series of planes or segments 308. The segments 308 can be subsets of frames that permit parallel processing, for example. The segments 308 can also be subsets of frames that can separate the video data into separate colors. For example, a frame 306 of color video data can include a luminance plane and two chrominance planes. The segments 308 may be sampled at different resolutions.

Whether or not the frame 306 is divided into segments 308, the frame 306 may be further subdivided into blocks 310, which can contain data corresponding to, for example, 16×16 pixels in the frame 306. The blocks 310 can also be arranged to include data from one or more segments 308 of pixel data. The blocks 310 can also be of any other suitable size such as 4×4 pixels, 8×8 pixels, 16×8 pixels, 8×16 pixels, 16×16 pixels, or larger. Unless otherwise noted, the terms block and macroblock are used interchangeably herein.

Figure 4:
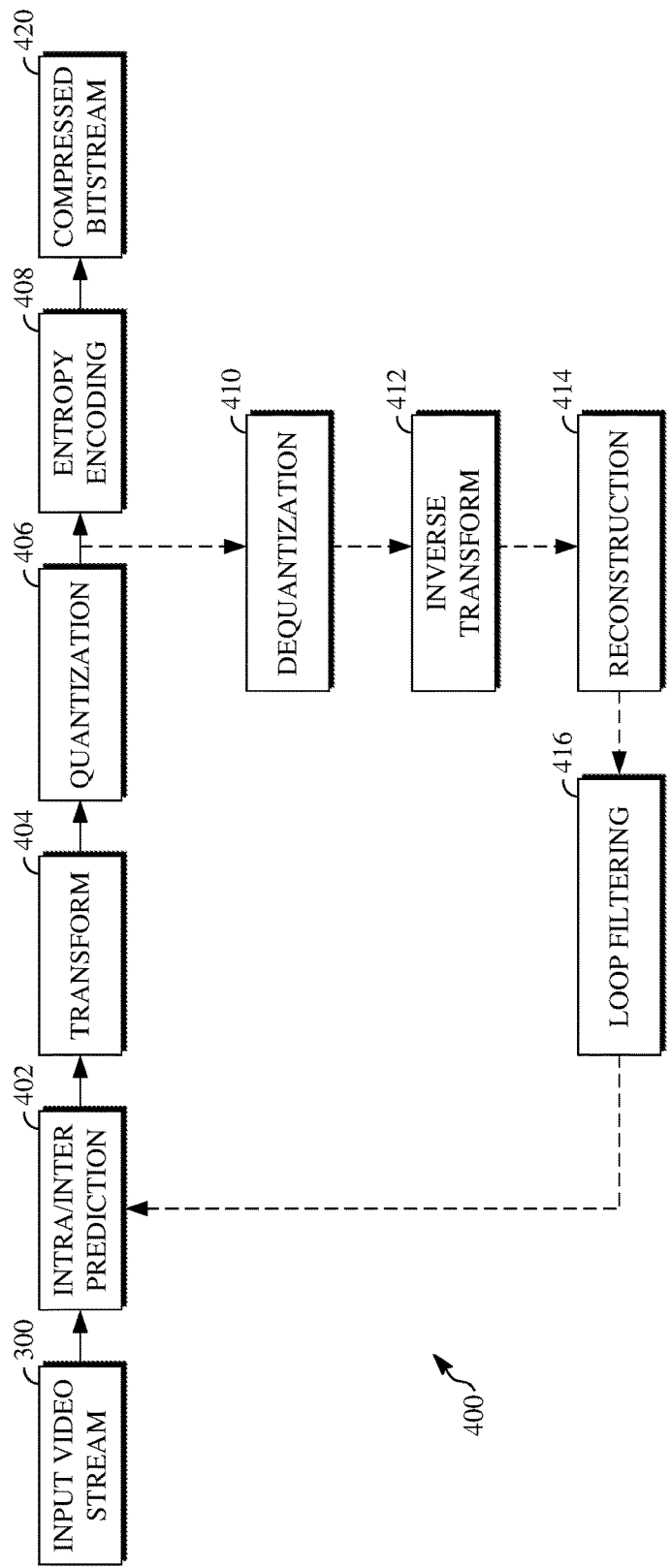
FIG. 4 is a block diagram of an encoder according to implementations of this disclosure.

FIG. 4 is a block diagram of an encoder 400 according to implementations of this disclosure. The encoder 400 can be implemented, as described above, in the transmitting station 102, such as by providing a computer software program stored in memory, for example, the memory 204. The computer software program can include machine instructions that, when executed by a processor such as the CPU 202, cause the transmitting station 102 to encode video data in the manner described in FIG. 4. The encoder 400 can also be implemented as specialized hardware included in, for example, the transmitting station 102. In one particularly desirable implementation, the encoder 400 is a hardware encoder.

The encoder 400 has the following stages to perform the various functions in a forward path (shown by the solid connection lines) to produce an encoded or compressed bitstream 420 using the video stream 300 as input: an intra/inter prediction stage 402, a transform stage 404, a quantization stage 406, and an entropy encoding stage 408. The encoder 400 may also include a reconstruction path (shown by the dotted connection lines) to reconstruct a frame for encoding of future blocks. In FIG. 4, the encoder 400 has the following stages to perform the various functions in the reconstruction path: a dequantization stage 410, an inverse transform stage 412, a reconstruction stage 414, and a loop filtering stage 416. Other structural variations of the encoder 400 can be used to encode the video stream 300.

When the video stream 300 is presented for encoding, respective adjacent frames 304, such as the frame 306, can be processed in units of blocks. At the intra/inter prediction stage 402, respective blocks can be encoded using intra-frame prediction (also called intra-prediction) or inter-frame prediction (also called inter-prediction). In any case, a prediction block can be formed. In the case of intra-prediction, a prediction block may be formed from samples in the current frame that have been previously encoded and reconstructed. In the case of inter-prediction, a prediction block may be formed from samples in one or more previously constructed reference frames. Implementations for forming a prediction block are discussed below with respect to FIGS. 6, 7, and 8, for example, using parameterized motion model identified for encoding a current block of a video frame.

Next, still referring to FIG. 4, the prediction block can be subtracted from the current block at the intra/inter prediction stage 402 to produce a residual block (also called a residual). The transform stage 404 transforms the residual into transform coefficients in, for example, the frequency domain using block-based transforms. The quantization stage 406 converts the transform coefficients into discrete quantum values, which are referred to as quantized transform coefficients, using a quantizer value or a quantization level. For example, the transform coefficients may be divided by the quantizer value and truncated. The quantized transform coefficients are then entropy encoded by the entropy encoding stage 408. The entropy-encoded coefficients, together with other information used to decode the block (which may include, for example, the type of prediction used, transform type, motion vectors and quantizer value), are then output to the compressed bitstream 420. The compressed bitstream 420 can be formatted using various techniques, such as variable length coding (VLC) or arithmetic coding. The compressed bitstream 420 can also be referred to as an encoded video stream or encoded video bitstream, and the terms will be used interchangeably herein.

The reconstruction path in FIG. 4 (shown by the dotted connection lines) can be used to ensure that the encoder 400 and a decoder 500 (described below) use the same reference frames to decode the compressed bitstream 420. The reconstruction path performs functions that are similar to functions that take place during the decoding process (described below), including dequantizing the quantized transform coefficients at the dequantization stage 410 and inverse transforming the dequantized transform coefficients at the inverse transform stage 412 to produce a derivative residual block (also called a derivative residual). At the reconstruction stage 414, the prediction block that was predicted at the intra/inter prediction stage 402 can be added to the derivative residual to create a reconstructed block. The loop filtering stage 416 can be applied to the reconstructed block to reduce distortion such as blocking artifacts.

Other variations of the encoder 400 can be used to encode the compressed bitstream 420. For example, a non-transform based encoder can quantize the residual signal directly without the transform stage 404 for certain blocks or frames. In another implementation, an encoder can have the quantization stage 406 and the dequantization stage 410 combined in a common stage.

Figure 5:
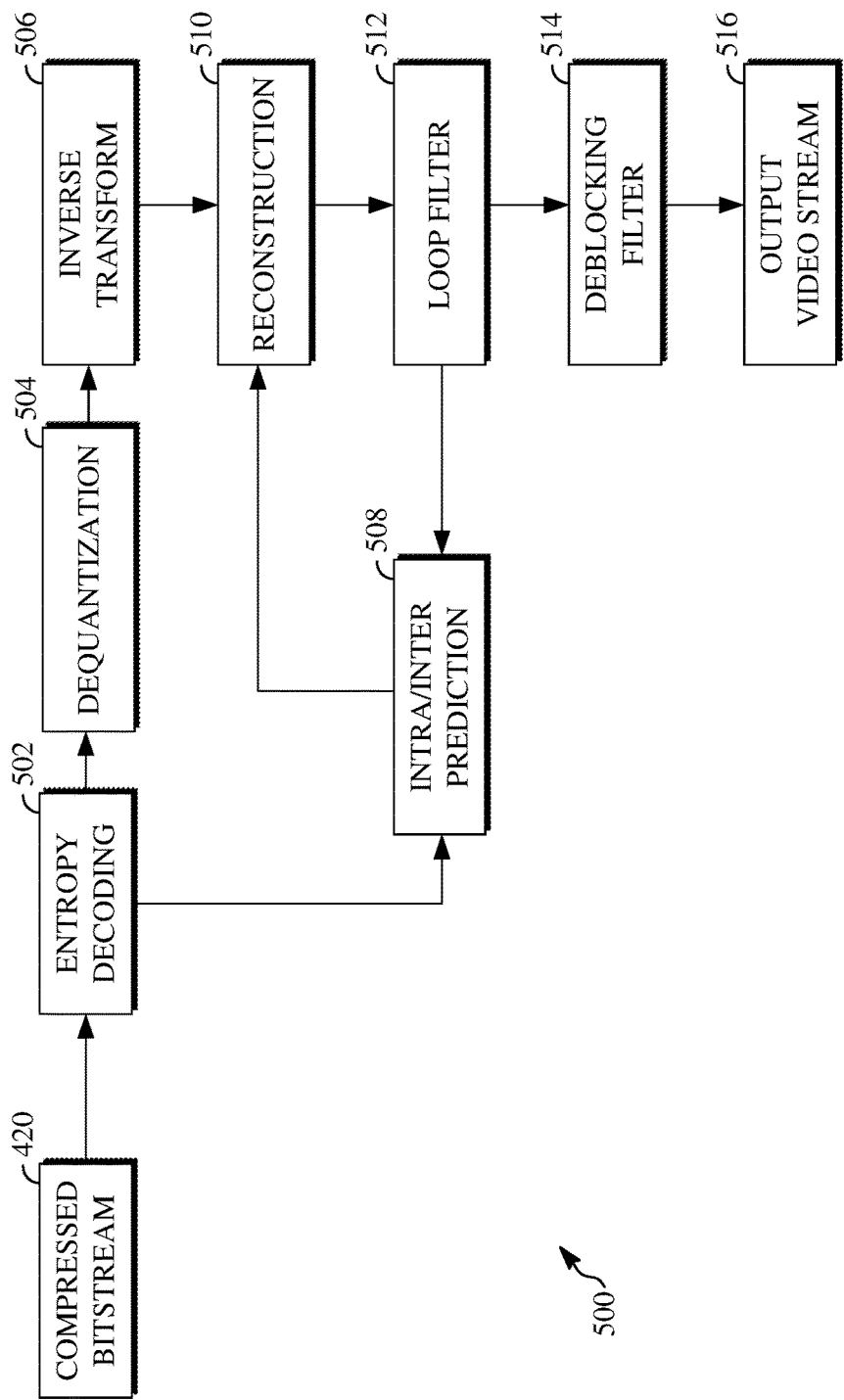
FIG. 5 is a block diagram of a decoder according to implementations of this disclosure.

FIG. 5 is a block diagram of a decoder 500 according to implementations of this disclosure. The decoder 500 can be implemented in the receiving station 106, for example, by providing a computer software program stored in the memory 204. The computer software program can include machine instructions that, when executed by a processor such as the CPU 202, cause the receiving station 106 to decode video data in the manner described in FIG. 5. The decoder 500 can also be implemented in hardware included in, for example, the transmitting station 102 or the receiving station 106.

The decoder 500, similar to the reconstruction path of the encoder 400 discussed above, includes in one example the following stages to perform various functions to produce an output video stream 516 from the compressed bitstream 420: an entropy decoding stage 502, a dequantization stage 504, an inverse transform stage 506, an intra/inter prediction stage 508, a reconstruction stage 510, a loop filtering stage 512, and a deblocking filtering stage 514. Other structural variations of the decoder 500 can be used to decode the compressed bitstream 420.

When the compressed bitstream 420 is presented for decoding, the data elements within the compressed bitstream 420 can be decoded by the entropy decoding stage 502 to produce a set of quantized transform coefficients. The dequantization stage 504 dequantizes the quantized transform coefficients (e.g., by multiplying the quantized transform coefficients by the quantizer value), and the inverse transform stage 506 inverse transforms the dequantized transform coefficients to produce a derivative residual that can be identical to that created by the inverse transform stage 412 in the encoder 400. Using header information decoded from the compressed bitstream 420, the decoder 500 can use the intra/inter prediction stage 508 to create the same prediction block as was created in the encoder 400, e.g., at the intra/inter prediction stage 402. Implementations for forming a same prediction block as was created in the encoder 400 are discussed below with respect to FIGS. 6, 7, and 8, for example, using parameterized motion model identified for decoding an encoded block of an encoded video frame. At the reconstruction stage 510, the prediction block can be added to the derivative residual to create a reconstructed block. The loop filtering stage 512 can be applied to the reconstructed block to reduce blocking artifacts.

Other filtering can be applied to the reconstructed block. In this example, the deblocking filtering stage 514 is applied to the reconstructed block to reduce blocking distortion, and the result is output as the output video stream 516. The output video stream 516 can also be referred to as a decoded video stream, and the terms will be used interchangeably herein. Other variations of the decoder 500 can be used to decode the compressed bitstream 420. For example, the decoder 500 can produce the output video stream 516 without the deblocking filtering stage 514.

Figure 6:
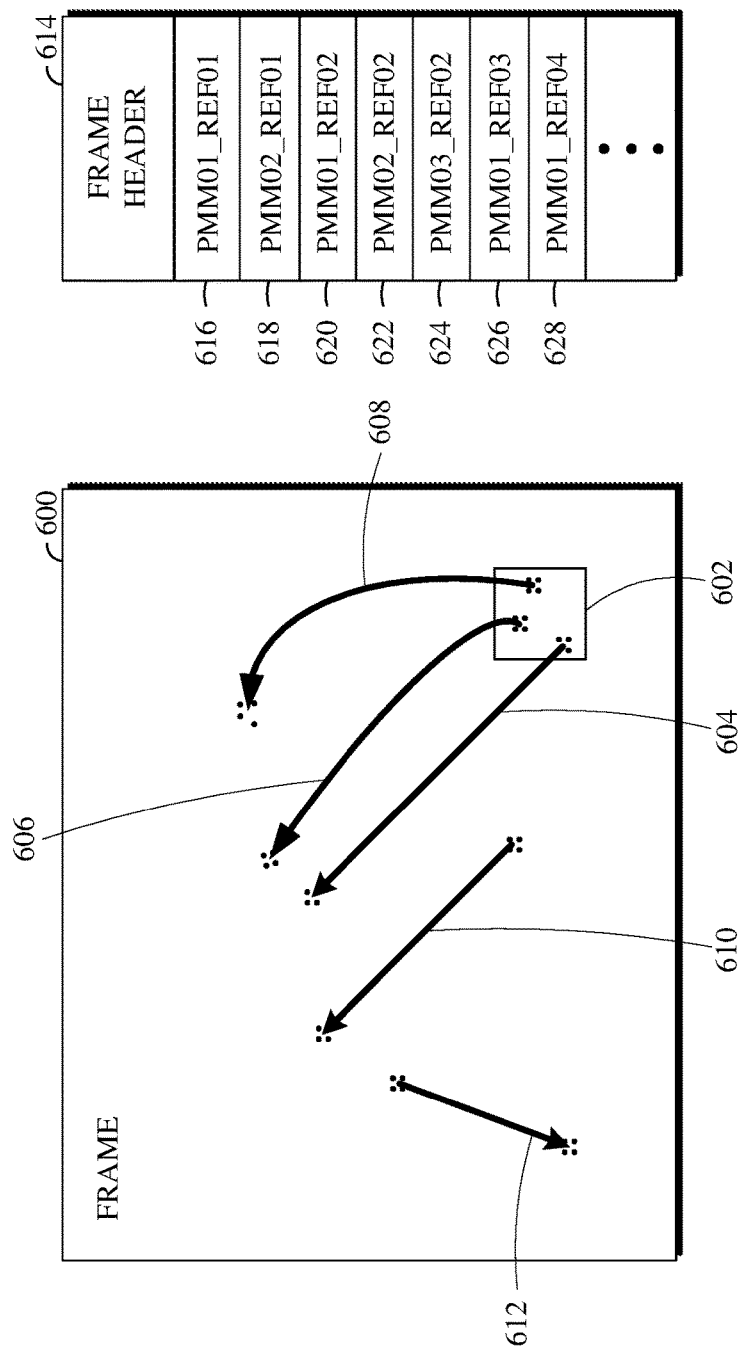
FIG. 6 is an illustration of examples of motion within a video frame.

FIG. 6 is an illustration of examples of motion within a video frame 600. A block 602 within the video frame 600 can include warped motion that might not be accurately predicted using motion vectors determined via regular motion compensation (e.g., typical translational inter-prediction). For example, the motion within the block 602 might scale, rotate, or otherwise move in a not entirely linear manner in any number of different directions. Regular motion compensation can miss certain portions of the motion falling outside of the rectangular geometry or use an unnecessary number of bits to predict the motion. As such, a prediction block used to encode or decode the block 602 can be formed, or generated, using a parameterized motion model.

Motion within the video frame 600 may be global motion. For example, motion within the video frame 600 can be considered a global motion where a large number of pixels of the blocks of the video frame 600 yield a low prediction error. A prediction error threshold can be defined, and values for all or a portion of the pixels of the blocks of the video frame 600 can be compared thereto. In another example, motion within the video frame 600 can be considered global motion where it is in a direction common with most other motion within the video frame 600.

The video frame 600 includes motion at 604, 606, and 608. The motion at 604, 606, and 608 demonstrate motion of pixels of the block 602 in a generally common direction to linear and non-linear locations external to the block 602 within the video frame 600. For example, the motion shown at 604 is a translational motion from a leftmost set of pixels of the block 602. The motion shown at 606 is a rotational motion from a middle set of pixels of the block 602. The motion shown at 608 is a warped motion from a rightmost set of pixels of the block 602. Because the direction of the motion shown at 604, 606, and 608 is a most common direction within the video frame 600, the motion shown at 604, 606, and 608 is global motion.

The global motion within the video frame 600 may not be entirely associated with the block 602. For example, the global motion can include motion of pixels located within the video frame 600 and outside of the block 602, such as is shown at 610. In addition to the global motion, the video frame 600 may have local motion within a portion of the video frame 600. For example, a local motion is shown at 612 as moving pixels in a direction different from the global motion shown at 604, 606, 608, and 610. Local motion within the video frame 600 may be contained within one block or within a number of adjacent blocks. The video frame 600 may include multiple different local motions.

A frame header 614 of the video frame 600 includes references to reference frames available for encoding or decoding the block 602. The references to the reference frames in the frame header 614 can be for parameterized motion model associated with those reference frames. A parameterized motion model corresponds to a motion model type (described later with respect to FIG. 7) and indicates how pixels of the block 602 can be warped to generate a prediction block usable for encoding or decoding the block 602.

For example, the parameterized motion model 616 corresponds to a first motion model associated with a first reference frame. The parameterized motion model 618 corresponds to a second motion model associated with the first reference frame. The parameterized motion model 620 corresponds to a first motion model associated with a second reference frame. The parameterized motion model 622 corresponds to a second motion model associated with the second reference frame. The parameterized motion model 624 corresponds to a third motion model associated with the second reference frame. The parameterized motion model 626 corresponds to a first motion model associated with a third reference frame. The parameterized motion model 628 corresponds to a first motion model associated with a fourth reference frame.

The parameterized motion models associated with a reference frame may correspond to one or more motion model types. For example, the parameterized motion model 616 and the parameterized motion model 618 may respectively correspond to a homographic motion model and an affine motion model for the first reference frame. In some implementations, each reference frame can be associated with multiple parameterized motion models of a single motion model type. For example, the parameterized motion model 616 and the parameterized motion model 618 may both correspond to different homographic motion models. However, in some implementations, a reference frame may be limited to one motion model for each motion model type. Further, in some implementations, a reference frame may be limited to a single motion model total. In such a case, that motion model may be replaced in certain situations, such as where a new motion model results in a lower prediction error.

In some implementations, parameterized motion models may indicate a global motion within multiple frames of a video sequence. As such, the parameterized motion models encoded within the frame header 614 may be used to generate prediction blocks for multiple blocks in multiple frames of a video sequence. In some implementations, the reference frames associated with parameterized motion models in the frame header 614 may be selected from a reference frame buffer, such as by using bits encoded to the frame header 614. For example, the bits encoded to the frame header 614 may point to virtual index locations of the reference frames within the reference frame buffer.

FIGS. 7A-D are illustrations of examples of warping pixels of a block of a video frame according to a parameterized motion model. A parameterized motion model used to warp pixels of a block of a frame can correspond to a motion model type. The motion model type that corresponds to a parameterized motion model may be a homographic motion model type, an affine motion model type, a similarity motion model type, or a translational motion model type. The parameterized motion model to use can be indicated by data associated with reference frames, such as within frame headers of an encoded bitstream.

The FIGS. 7A-D depict different motion model types used to project pixels of a block to a warped patch within a reference frame. The warped patch can be used to generate a prediction block for encoding or decoding that block. A parameterized motion model indicates how the pixels of a block are to be scaled, rotated, or otherwise moved when projected into the reference frame. Data indicative of pixel projections can be used to identify parameterized motion models corresponding to a respective motion model. The number and function of the parameters of a parameterized motion model depend upon the specific projection used.

Figure 7A:
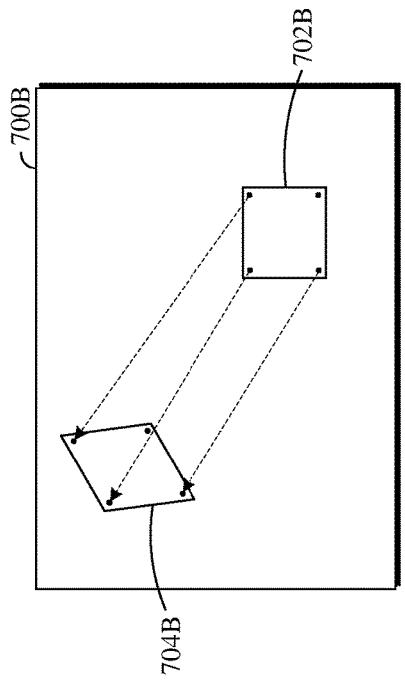
FIGS. 7A-D are illustrations of examples of warping pixels of a block of a video frame according to a parameterized motion model.

In FIG. 7A, pixels of a block 702A are projected to a warped patch 704A of a frame 700A using a homographic motion model. A homographic motion model uses eight parameters to project the pixels of the block 702A to the warped patch 704A. A homographic motion is not bound by a linear transformation between the coordinates of two spaces. As such, the eight parameters that define a homographic motion model can be used to project pixels of the block 702A to a quadrilateral patch (e.g., the warped patch 704A) within the frame 700A. Homographic motion models thus support translation, rotation, scale, changes in aspect ratio, shearing, and other non-parallelogram warping. A homographic motion between two spaces is defined as follows:

$$x = \frac{a*X + b*Y + c}{g*X + h*Y + 1}; \text{ and}$$

$$y = \frac{d*X + e*Y + f}{g*X + h*Y + 1}.$$

In these equations, (x, y) and (X, Y) are coordinates of two spaces, namely, a projected position of a pixel within the frame 700A and an original position of a pixel within the block 702A, respectively. Further, a, b, c, d, e, f, g, and h are the homographic parameters and are real numbers representing a relationship between positions of respective pixels within the frame 700A and the block 702A. Of these parameters, a represents a fixed scale factor along the x-axis with the scale of the y-axis remaining unchanged, b represents a scale factor along the x-axis proportional to the y-distance to a center point of the block, c represents a translation along the x-axis, d represents a scale factor along the y-axis proportional to the x-distance to the center point of the block, e represents a fixed scale factor along the y-axis with the scale of the x-axis remaining unchanged, f represents a translation along the y-axis, g represents a proportional scale of factors of the x- and y-axes according to a function of the x-axis, and h represents a proportional scale of factors of the x- and y-axes according to a function of the y-axis.

Figure 7B:
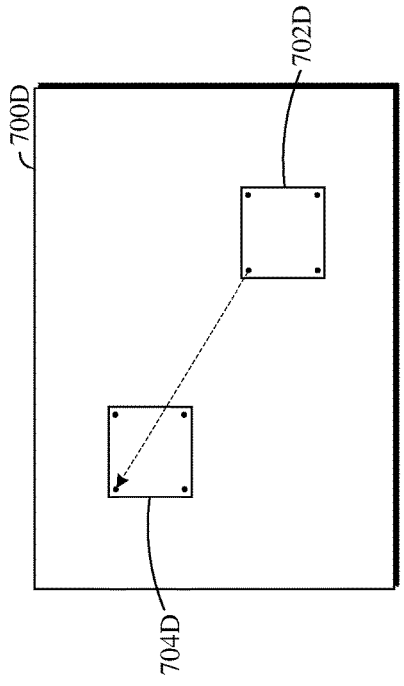

In FIG. 7B, pixels of a block 702B are projected to a warped patch 704B of a frame 700B using an affine motion model. An affine motion model uses six parameters to project the pixels of the block 702B to the warped patch 704B. An affine motion is a linear transformation between the coordinates of two spaces defined by the six parameters. As such, the six parameters that define an affine motion model can be used to project pixels of the block 702B to a parallelogram patch (e.g., the warped patch 704B) within the frame 700B. Affine motion models thus support translation, rotation, scale, changes in aspect ratio, and shearing. The affine projection between two spaces is defined as follows:

$$x=a*X+b*Y+c; \text{ and}$$

$$y=d*X+e*Y+f.$$

In these equations, (x, y) and (X, Y) are coordinates of two spaces, namely, a projected position of a pixel within the frame 700B and an original position of a pixel within the block 702B, respectively. Also, a, b, c, d, e, and f are affine parameters and are real numbers representing a relationship between positions of respective pixels within the frame 700B and the block 702B. Of these, a and d represent rotational or scaling factors along the x-axis, b and e represent rotational or scaling factors along the y-axis, and c and f respectively represent translation along the x- and y-axes.

Figure 7C:
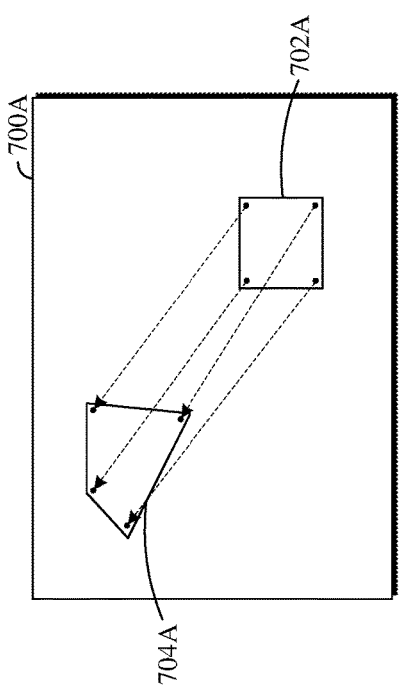

In FIG. 7C, pixels of a block 702C are projected to a warped patch 704C of a frame 700C using a similarity motion model. A similarity motion model uses four parameters to project the pixels of the block 702C to the warped patch 704C. A similarity motion is a linear transformation between the coordinates of two spaces defined by the four parameters. For example, the four parameters can be a translation along the x-axis, a translation along the y-axis, a rotation value, and a zoom value. As such, the four parameters that define a similarity motion model can be used to project pixels of the block 702C to a square patch (e.g., the warped patch 704C) within the frame 700C. Similarity motion models thus support square to square transformation with rotation and zoom.

Figure 7D:
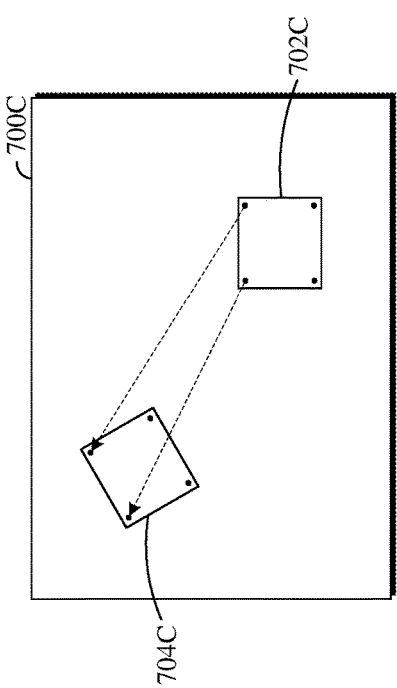

In FIG. 7D, pixels of a block 702D are projected to a warped patch 704D of a frame 700D using a translational motion model. A translational motion model uses two parameters to project the pixels of the block 702D to the warped patch 704D. A translational motion is a linear transformation between the coordinates of two spaces defined by the two parameters. For example, the two parameters can be a translation along the x-axis and a translation along the y-axis. As such, the two parameters that define a translational motion model can be used to project pixels of the block 702D to a square patch (e.g., the warped patch 704D) within the frame 700D.

Figure 8:
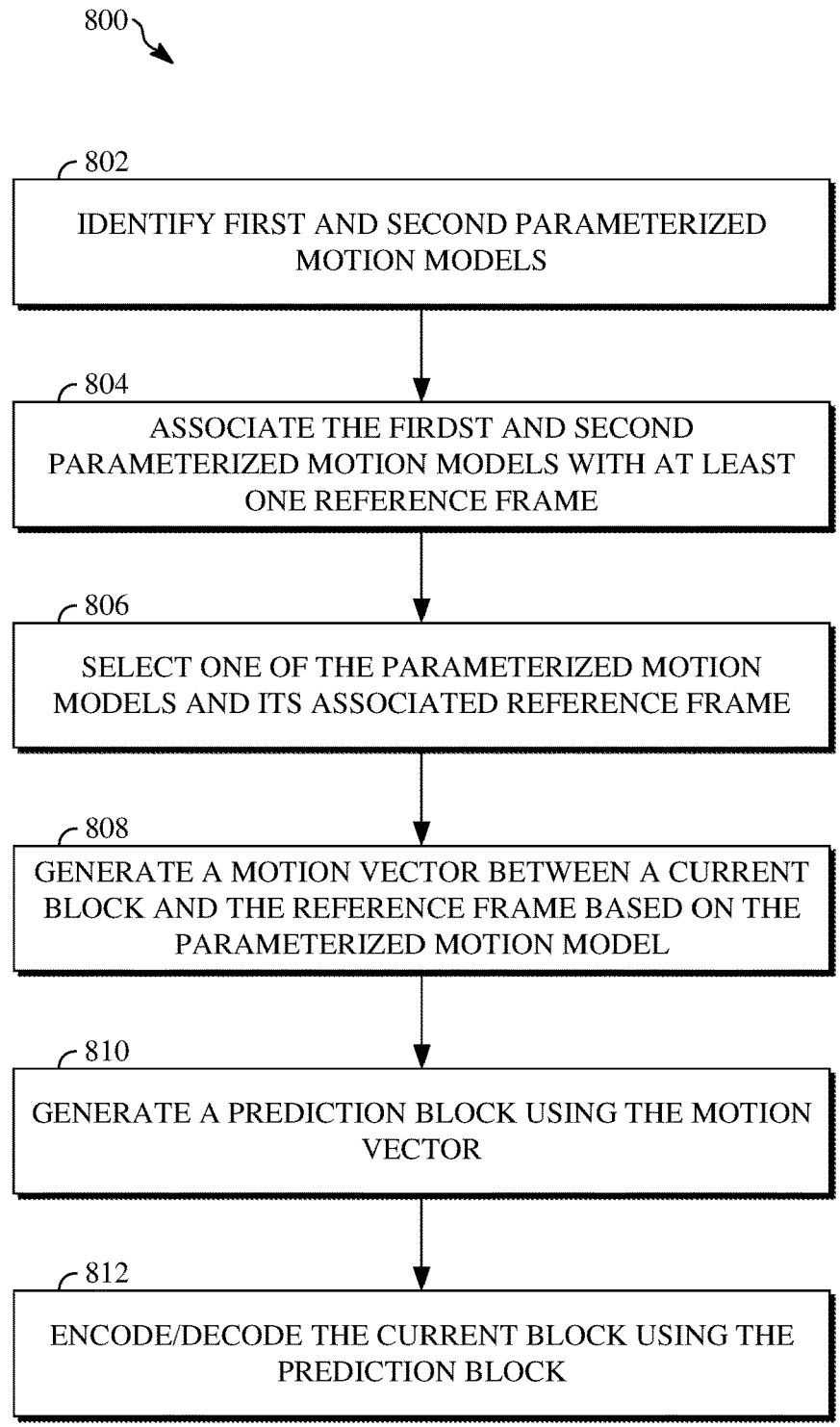
FIG. 8 is a flowchart diagram of a process for using a parameterized motion model to encode or decode a current block of a frame.

FIG. 8 is a flowchart diagram of a process 800 for using a parameterized motion model to encode or decode a current block of a frame. The process 800 can be implemented, for example, as a software program that may be executed by computing devices such as the transmitting station 102 or the receiving station 106. For example, the software program can include machine-readable instructions that may be stored in a memory such as the memory 204 or the secondary storage 214, and that, when executed by a processor, such as the CPU 202, may cause the computing device to perform the process 800. The process 800 can be implemented using specialized hardware or firmware. As explained above, some computing devices may have multiple memories or processors, and the operations described in the process 800 can be distributed using multiple processors, memories, or both.

References within the below description of the process 800 include discussion of encoding or decoding a current block. While all or a portion of the process 800 may be used to encode or decode the current block, references to "encoding" or "decoding" (or the like) the current block refer to an applicable operation. For example, when the process 800 is used to encode a current block, references to "decoding" (or the like) may be disregarded. Similarly, when the process 800 is used to decode a current (e.g., encoded) block, references to "encoding" (or the like) may be disregarded.

At 802, first and second parameterized motion models are identified. Identifying a parameterized motion model can include generating the parameterized motion model or identifying a previously generated parameterized motion model. Identifying a parameterized motion model can include warping pixels of a reference frame to a current frame according to parameters of a motion model type to produce warped pixels. The reference frame can then be warped to the current frame to determine a prediction error for the warped pixels. If the prediction error for the warped pixels satisfies a threshold (e.g., where the prediction error therefor is lower than a defined threshold value), a parameterized motion model corresponding to the motion model type is identified based on the parameters. At 804, the first and second parameterized motion models are associated with at least one reference frame. For example, the parameterized motion model identified responsive to determining that its prediction error satisfied a threshold is associated with the reference frame used to produce the warped pixels.

At 806, one of the parameterized motion models identified at 802 is selected along with a reference frame associated with it at 804. The parameterized motion model that is selected can be a parameterized motion model having a lowest prediction error amongst the parameterized motion models identified at 802. For example, the prediction errors determined for the warped pixels produced at 802 can be compared to a threshold. The threshold used for comparison at 804 can be the same threshold referenced above with respect to 802. Alternatively, the threshold used for comparison at 804 can be different from the threshold referenced above with respect to 802. For each reference frame, a first prediction error can be calculated for its first parameterized motion model and a second prediction error can be calculated for its second parameterized motion model. The reference frame that is selected is the reference frame having a parameterized motion model with the lowest prediction error.

At 808, motion vector is generated between the current block and the reference frame selected at 806 based on the parameterized motion model selected at 806. The motion vector can be generated by warping pixels of the current block to a warped patch within the selected reference frame according to the selected parameterized motion model. For example, the pixels of the current block are projected to the warped patch within the reference frame. The shape and size of the warped patch to which the pixels of the current block are projected depends upon the motion model associated with the selected parameterized motion model. The warped patch can be a rectangular patch or a non-rectangular patch. For example, if the parameterized motion model is of a translational motion model type, the warped patch is a rectangular block that is the same size as the current block. In another example, if the parameterized motion model is of a homographic motion model type, the warped patch may be any quadrilateral and of any size. The position of the warped patch also depends upon the motion model. For example, the parameters of the parameterized motion model indicates an x-axis and/or y-axis translation for the warped patch. The parameters of the parameterized motion model may further indicate a rotation, zoom, or other motional change for the warped patch.

The warped patch can then be unwarped using the motion vector to return the current block to generate a prediction block at 810. The prediction block can have a rectangular geometry for predicting the current block. For example, unwarping the projected pixels of the warped patch after respective pixels are projected to the warped patch of the reference frame can include projecting the warped patch to a rectangular block using the motion vector generated at 808. The pixel position coordinates of the warped patch of the reference frame can be projected to the rectangular block based on respective coordinate translations to the rectangular block. The resulting rectangular block can be used to generate the prediction block. At 812, the current block is encoded or decoded using the prediction block generated at 810.

For simplicity of explanation, the process 800 is depicted and described as a series of steps or operations. However, the steps or operations in accordance with this disclosure can occur in various orders and/or concurrently. Additionally, other steps or operations not presented and described herein may be used. Furthermore, not all illustrated steps or operations may be required to implement a method in accordance with the disclosed subject matter.

In some implementations, there may be more than first and second parameterized motion models identified and associated with reference frames. For example, there may be four parameterized motion models associated with each reference frame, wherein each of the four parameterized motion models corresponds to one of a homographic motion model type, an affine motion model type, a similarity motion model type, or a translational motion model type. In some implementations, one or more reference frames can have multiple parameterized motion models associated with it that correspond to one motion model type. In some implementations, a reference frame may only have one parameterized motion model associated with it. In some implementations, not all of the parameterized motion models identified at 802 are associated with all of the reference frames at 804. For example, first, second, and third parameterized motion models may be associated with a first reference frame, while only the first and second parameterized motion models are associated with a second reference frame.

In some implementations, identifying the parameterized motion models at 802 may include calculating a difference between a motion vector of the current block and a motion of a reference frame available for encoding or decoding the current frame. A parameterized motion model can be identified or otherwise generated based on the calculated difference. For example, the difference between those motion vectors can indicate an x-axis and/or y-axis translation, a rotation, a zoom, a shear, or other motional changes to the pixels of the current block. In some implementations, a parameterized motion model may be identified or otherwise generated for a current block by determining a motion vector at a center position of the current block. The parameterized motion model used to encode or decode the current block may thus be of a translational motion model type.

In some implementations, a parameterized motion model can be encoded to a bitstream responsive to being identified. For example, a parameterized motion model identified for a reference frame can be encoded to a frame header of that reference frame. Multiple parameterized motion models can be encoded to the frame header of a reference frame. Because the reference frames are pre-compressed, encoding a parameterized motion model to a frame header of a reference frame can include selecting the reference frame, for example, based on a virtual index location of the reference frame. Bits indicative of the parameterized motion models can then be encoded to the frame header of the reference frame.

The frame header for an inter-frame frame of the video sequence can include data indicating one or more parameterized motion models usable to encode or decode one or more blocks thereof. For example, the data encoded to the frame header of an inter-frame frame can include the parameters of a parameterized motion model. The data may also include a coded flag indicating a number of parameterized motion models available to the inter-frame frame.

In some implementations, a reference frame may not have a parameterized motion model. For example, there may be too many distinct motions within the reference frame to identify a global motion. In another example, the prediction errors determined for warped pixels based on motion models at 802 may not satisfy the threshold. In such a case, blocks of frames using that reference frame can be encoded or decoded using zero motion. In some implementations, a zero motion model may by default be encoded to the frame header of all or some of the inter-frame frames of a video sequence.

In some implementations, a current block encoded using a parameterized motion model is decoded by warping the pixels of the encoded block according to the parameterized motion model. The warped pixels of the encoded block are then interpolated. For example, the interpolation can be performed using a 6-tap by 6-tap subpixel filter. In another example, the interpolation can be performed using bicubic interpolation. Bicubic interpolation can include using a 4-tap by 4-tap window to interpolate the subpixel values of an encoded block. In some implementations, bicubic interpolation can include applying a horizontal sheer and a vertical sheer to an encoded block.

The aspects of encoding and decoding described above illustrate some examples of encoding and decoding techniques. However, it is to be understood that encoding and decoding, as those terms are used in the claims, could mean compression, decompression, transformation, or any other processing or change of data.

The word "example" is used herein to mean serving as an example, instance, or illustration. Any aspect or design described herein as "example" is not necessarily to be construed as being preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. That is, if X includes A; X includes B; or X includes both A and B, then "X includes A or B" is satisfied under any of the foregoing instances. In addition, the articles "a" and "an" as used in this application and the appended claims should generally be construed to mean "one or more," unless specified otherwise or clearly indicated by the context to be directed to a singular form. Moreover, use of the term "an implementation" or the term "one implementation" throughout this disclosure is not intended to mean the same embodiment or implementation unless described as such.

Implementations of the transmitting station 102 and/or the receiving station 106 (and the algorithms, methods, instructions, etc., stored thereon and/or executed thereby, including by the encoder 400 and the decoder 500) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably. Further, portions of the transmitting station 102 and the receiving station 106 do not necessarily have to be implemented in the same manner.

Further, in one aspect, for example, the transmitting station 102 or the receiving station 106 can be implemented using a general purpose computer or general purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

The transmitting station 102 and the receiving station 106 can, for example, be implemented on computers in a video conferencing system. Alternatively, the transmitting station 102 can be implemented on a server, and the receiving station 106 can be implemented on a device separate from the server, such as a handheld communications device. In this instance, the transmitting station 102, using an encoder 400, can encode content into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 102. Other suitable transmitting and receiving implementation schemes are available. For example, the receiving station 106 can be a generally stationary personal computer rather than a portable communications device, and/or a device including an encoder 400 may also include a decoder 500.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or semiconductor device. Other suitable mediums are also available.

The above-described embodiments, implementations, and aspects have been described in order to facilitate easy understanding of this disclosure and do not limit this disclosure. On the contrary, this disclosure is intended to cover various modifications and equivalent arrangements included within the scope of the appended claims, which scope is to be accorded the broadest interpretation as is permitted under the law so as to encompass all such modifications and equivalent arrangements.

What is claimed is:

1. A method for encoding blocks of a video frame having multiple global motions using multiple parameterized motion models, the method comprising:
    determining, based on one or more reference frames, that a first block of the video frame includes a first global motion and that a second block of the video frame includes a second global motion, wherein the first global motion corresponds to a first motion model type and the second global motion corresponds to a second motion model type;
    selecting a first parameterized motion model corresponding to the first motion model type and a second parameterized motion model corresponding to the second motion model type, wherein the first parameterized motion model is associated with a first reference frame of the one or more reference frames and the second parameterized motion model is associated with a second reference frame of the one or more reference frames;
    generating a first motion vector between the first block and the first reference frame based on the first parameterized motion model;
    generating a first prediction block using the first motion vector;
    encoding the first block using the first prediction block;
    generating a second motion vector between the second block and the second reference frame based on the second parameterized motion model;
    generating a second prediction block using the second motion vector; and
    encoding the second block using the second prediction block.

2. The method of claim 1, wherein selecting the first parameterized motion model corresponding to the first motion model type and the second parameterized motion model corresponding to the second motion model type comprises:
    warping pixels of a reference frame of the one or more reference frames to the video frame according to parameters of a motion model type to produce warped pixels; and
    identifying a parameterized motion model responsive to determining that a prediction error for the warped pixels satisfies a threshold, wherein a motion model type to which the parameterized motion model corresponds is based on the parameters.

3. The method of claim 1, wherein each of the first motion model type and the second motion model type corresponds to a different type of non-translational motion.

4. The method of claim 1, wherein selecting the first parameterized motion model corresponding to the first motion model type and the second parameterized motion model corresponding to the second motion model type comprises:
    calculating a difference between a motion vector of the first block and a motion vector of the first reference frame; and
    identifying the first parameterized motion model based on the difference.

5. The method of claim 1, wherein selecting the first parameterized motion model corresponding to the first motion model type and the second parameterized motion model corresponding to the second motion model type comprises:
    for each reference frame of the one or more reference frames, calculating a first prediction error by warping pixels of the reference frame to the video frame according to the first parameterized motion model and a second prediction error by warping the pixels of the reference frame to the video frame according to the second parameterized motion model; and
    identifying a parameterized motion model having a lowest prediction error from the first prediction errors and the second prediction errors; and
    identifying a reference frame of the one or more reference frames that is associated with the identified parameterized motion model.

6. The method of claim 1, wherein generating a first motion vector between the first block and the first reference frame based on the first parameterized motion model comprises:
    projecting pixels of the first block to a warped patch within the first reference frame according to the first parameterized motion model, wherein the warped patch is a non-rectangular patch having a shape and a position in the first reference frame indicated by the first parameterized motion model.

7. A method for decoding encoded blocks of an encoded video frame having multiple global motions using multiple parameterized motion models, the method comprising:
    determining, based on one or more reference frames, that a first encoded block of the encoded video frame includes a first global motion and that a second encoded block of the encoded video frame includes a second global motion, wherein the first global motion corresponds to a first motion model type and the second global motion corresponds to a second motion model type;
    selecting a first parameterized motion model corresponding to the first motion model type and a second parameterized motion model corresponding to the second motion model type, wherein the first parameterized motion model is associated with a first reference frame of the one or more reference frames and the second parameterized motion model is associated with a second reference frame of the one or more reference frames;
    generating a first motion vector between the first encoded block and the first reference frame based on the first parameterized motion model;
    generating a first prediction block using the first motion vector;
    decoding the first encoded block using the first prediction block;

generating a second motion vector between the second encoded block and the second reference frame based on the second parameterized motion model;

generating a second prediction block using the second motion vector; and decoding the second encoded block using the second prediction block.

8. The method of claim 7, wherein selecting the first parameterized motion model corresponding to the first motion model type and the second parameterized motion model corresponding to the second motion model type comprises:

warping pixels of a reference frame of the one or more reference frames to the encoded video frame according to parameters of a motion model type to produce warped pixels; and identifying a parameterized motion model responsive to determining that a prediction error for the warped pixels satisfies a threshold, wherein a motion model type to which the parameterized motion model corresponds is based on the parameters.

9. The method of claim 7, wherein each of the first motion model type and the second motion model type corresponds to a different type of non-translational motion.

10. The method of claim 7, wherein selecting the first parameterized motion model corresponding to the first motion model type and the second parameterized motion model corresponding to the second motion model type comprises:

calculating a difference between a motion vector of the first encoded block and a motion vector of the first reference frame; and identifying the first parameterized motion model based on the difference.

11. The method of claim 7, wherein selecting the first parameterized motion model corresponding to the first motion model type and the second parameterized motion model corresponding to the second motion model type comprises:

for each reference frame of the one or more reference frames, calculating a first prediction error by warping pixels of the reference frame to the encoded video frame according to the first parameterized motion model and a second prediction error by warping the pixels of the reference frame to the encoded video frame according to the second parameterized motion model; and identifying a parameterized motion model having a lowest prediction error from the first prediction errors and the second prediction errors; and identifying a reference frame of the one or more reference frames that is associated with the identified parameterized motion model.

12. The method of claim 7, wherein generating a first motion vector between the first encoded block and the first reference frame based on the first parameterized motion model comprises:

projecting pixels of the first encoded block to a warped patch within the first reference frame according to the first parameterized motion model, wherein the warped patch is a non-rectangular patch having a shape and a position in the first reference frame indicated by the first parameterized motion model.

13. The method of claim 7, wherein the first parameterized motion model and the second parameterized motion model are encoded to a frame header of the encoded video frame.

14. An apparatus for decoding encoded blocks of an encoded video frame having multiple global motions using multiple parameterized motion models, the apparatus comprising:

a processor configured to execute instructions stored in a non-transitory storage medium to:

determine, based on one or more reference frames, that a first encoded block of the encoded video frame includes a first global motion and that a second encoded block of the encoded video frame includes a second global motion, wherein the first global motion corresponds to a first motion model type and the second global motion corresponds to a second motion model type;

select a first parameterized motion model corresponding to the first motion model type and a second parameterized motion model corresponding to the second motion model type, wherein the first parameterized motion model is associated with a first reference frame of the one or more reference frames and the second parameterized motion model is associated with a second reference frame of the one or more reference frames;

generate a first motion vector between the first encoded block and the first reference frame based on the first parameterized motion model;

generate a first prediction block using the first motion vector;

decode the first encoded block using the first prediction block;

generate a second motion vector between the second encoded block and the second reference frame based on the second parameterized motion model;

generate a second prediction block using the second motion vector; and decode the second encoded block using the second prediction block.

15. The apparatus of claim 14, wherein the instructions to select the first parameterized motion model corresponding to the first motion model type and the second parameterized motion model corresponding to the second motion model type include instructions executable by the processor to:

warp pixels of a reference frame of the one or more reference frames to the encoded video frame according to parameters of a motion model type to produce warped pixels; and identify a parameterized motion model responsive to a determination that a prediction error for the warped pixels satisfies a threshold, wherein a motion model type to which the parameterized motion model corresponds is based on the parameters.

16. The apparatus of claim 14, wherein each of the first motion model type and the second motion model type corresponds to a different type of non-translational motion.

17. The apparatus of claim 14, wherein the instructions to select the first parameterized motion model corresponding to the first motion model type and the second parameterized motion model corresponding to the second motion model type include instructions executable by the processor to:

calculate a difference between a motion vector of the first encoded block and a motion vector of the first reference frame; and identify the first parameterized motion model based on the difference.

18. The apparatus of claim 14, wherein the instructions to select the first parameterized motion model corresponding to the first motion model type and the second parameterized motion model corresponding to the second motion model type include instructions executable by the processor to:

for each reference frame of the one or more reference frames, calculate a first prediction error by warping pixels of the reference frame to the encoded video frame according to the first parameterized motion model and a second prediction error by warping the pixels of the reference frame to the encoded video frame according to the second parameterized motion model; and identify a parameterized motion model having a lowest prediction error from the first prediction errors and the second prediction errors; and identify a reference frame of the one or more reference frames that is associated with the identified parameterized motion model.

19. The apparatus of claim 14, wherein the instructions to generate a first motion vector between the first encoded block and the first reference frame based on the first parameterized motion model include instructions executable by the processor to:

project pixels of the first encoded block to a warped patch within the first reference frame according to the first parameterized motion model, wherein the warped patch is a non-rectangular patch having a shape and a position in the first reference frame indicated by the first parameterized motion model.

20. The apparatus of claim 14, wherein the first parameterized motion model and the second parameterized motion model are encoded to a frame header of the encoded video frame.

* * * * *